US005764114A

United States Patent [19]

Kühne

[11] Patent Number: 5,764,114

[45] Date of Patent: Jun. 9, 1998

[54] EMP-FILTER IN A COAXIAL LINE

[75] Inventor: Gregor Kühne, St. Gallen, Switzerland

[73] Assignee: Huber & Suhner AG, Herisau, Switzerland

[21] Appl. No.: 623,234

[22] Filed: Mar. 28, 1996

[30] Foreign Application Priority Data

Mar. 31, 1995 [CH] Switzerland .............................. 914/95

[51] Int. Cl.$^{6}$ .............................. H04B 3/28; H02H 9/00; H01P 1/202

[52] U.S. Cl. .......................... 333/12; 333/24 R; 333/206

[58] Field of Search .................................. 333/12, 24 R, 333/222, 206

[56] References Cited

U.S. PATENT DOCUMENTS

| | | | |
|---|---|---|---|
| 2,941,169 | 6/1960 | Weinschel | 333/35 |
| 3,289,117 | 11/1966 | Kearns et al. | 333/206 |
| 3,970,969 | 7/1976 | Sirel et al. | 333/12 |
| 4,292,610 | 9/1981 | Makimoto et al. | 333/222 |

FOREIGN PATENT DOCUMENTS

| | | | |
|---|---|---|---|
| 0676900 | 3/1991 | Switzerland | 333/206 |

*Primary Examiner*—Benny Lee
*Assistant Examiner*—Barbara Summons
*Attorney, Agent, or Firm*—Jay H. Maioli

[57] ABSTRACT

An electro-magnetic pulse filter which can be used simultaneously for a plurality of frequency bands includes a housing (20) mounted in the outer conductor (10) and a λ/4 short-circuiting conductor (24), which is connected in an electrically conductive fashion to the inner conductor of a coaxial line (30) and is connected in an electrically conductive fashion to the end face of a housing (20). Arranged between the housing (20) and the short-circuiting conductor (24) is at least one sleeve (25) which is connected to the latter in a conductive fashion. The length of the short-circuiting line (24) corresponds to the λ/4 length of the lowest frequency band transmitted. Considered together, the sleeves (25, 26) produce a number of cavity resonators which are connected in series and are tuned with their length to various midband frequencies. It is directly possible by means of such cavity resonators connected in series to transmit a plurality of frequency bands, and thus to protect terminals against damaging current surges.

7 Claims, 2 Drawing Sheets

FIG. 1

EMP-FILTER IN A COAXIAL LINE

BACKGROUND OF THE INVENTION

1 . Field of the Invention

The present invention relates to an EMP filter in a coaxial line having a short-circuit arrangement, comprising a housing mounted on the outer conductor and a λ/4 short-circuiting conductor, which is connected in an electrically conductive fashion to the inner conductor of the coaxial line and is connected at the end face in an electrically conductive fashion to the mounted housing.

2. Description of the Prior Art

Electromagnetic pulses of artificial type, such as can be produced by motors, switches, switched-mode power supply units or the like, as well as of natural provenance, as from direct or indirect lightning strikes, are guided by inductive, capacitive or galvanic coupling via coaxial lines into the connected devices and can damage or even destroy the latter. It is known to protect the devices against interference voltages or lightning strike currents at their input by discharging or reflecting systems. For example, λ/4 short-circuiting lines, also called λ/4 shorting stubs or EMP filters, have been disclosed by means of which these damaging currents and voltages of specific frequencies can be discharged or reflected. Such an arrangement has been disclosed, for example, in CH-676900.

It is provided in that patent to use a λ/4 short-circuiting line connected between the inner conductor and outer conductor of the coaxial line to discharge or reflect these currents and voltages. This λ/4 short-circuiting line acts, by means of its filtering property, as a frequency-selective filter of the fundamental frequency and the odd harmonic oscillations thereof.

A disadvantage of such EMP filters is their limitation to one frequency band, as a result of which their use is rendered impossible in multiband systems such as tunnel communication, GSM/PCN and other known multiple frequency band applications. This can also limit further system extension. Furthermore, the storekeeping is expensive owing to storing individual filters for various frequency bands.

OBJECTS AND SUMMARY OF THE INVENTION

It is therefore an object of the invention to specify an EMP filter which can be used simultaneously for a plurality of frequency bands.

According to the invention, this is rendered possible by means of a structure characterized in that there is present between the housing and the short-circuiting conductor at least one sleeve which is connected to the latter in a conductive fashion, and in that the length of the short-circuiting line corresponds to the λ/4 wave length of the lowest frequency band transmitted.

BRIEF DESCRIPTION OF THE DRAWINGS

An exemplary embodiment of the invention is explained below with the aid of the drawings, in which.

DESCRIPTION OF THE PREFERRED EMBODIMENTS

Figure 1:
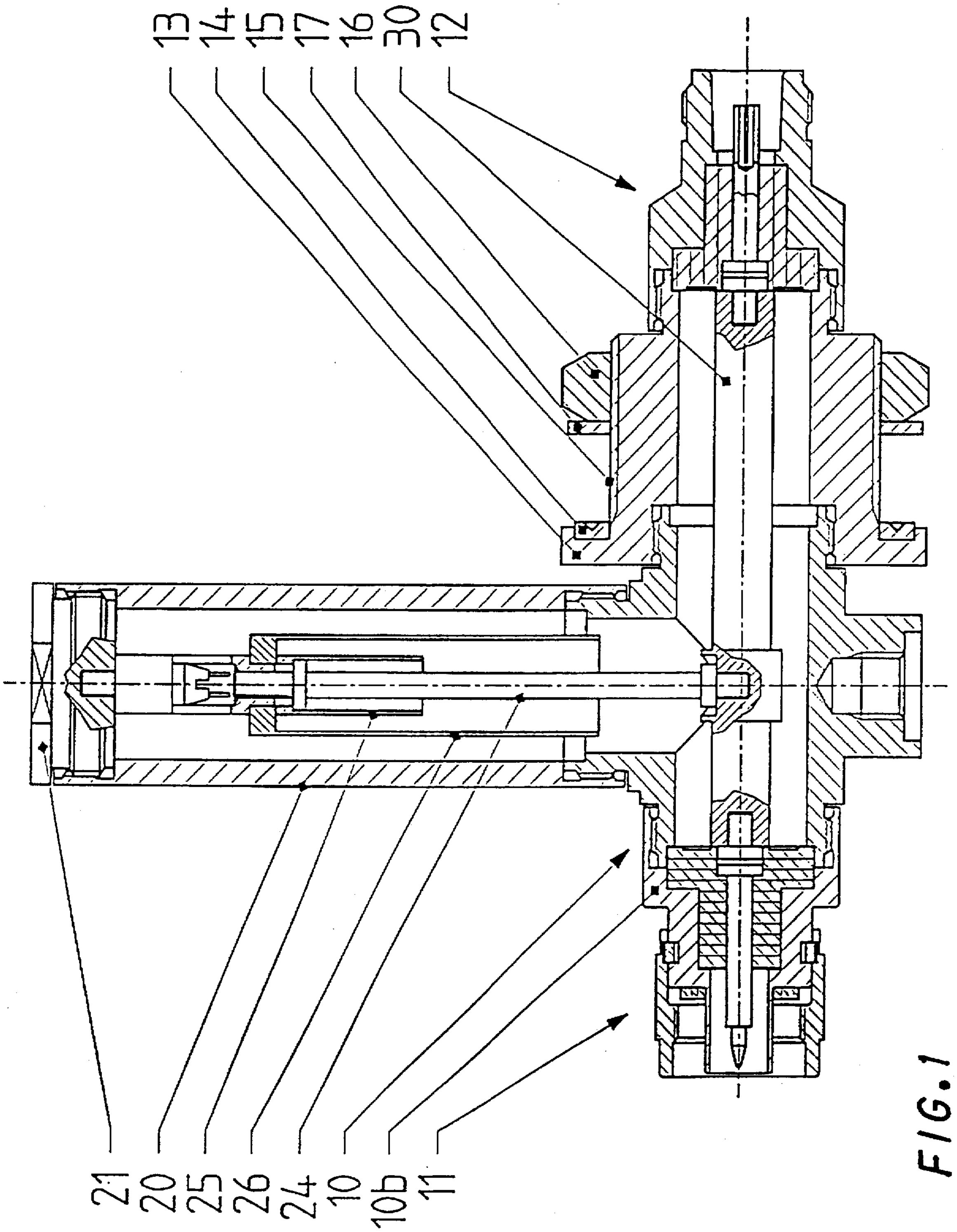
FIG. 1 shows a sectional view through an EMP filter according to the invention.

The EMP filter, which is configured as a pluggable coupling, consists of an outer conductor 10, which is constructed as a cylindrical housing having, arranged on both sides, plugs 11 and 12 for screw-type terminals of coaxial conductors. In this arrangement, the plug 11 to the left in the drawing is conceived as a connection into the unprotected region, for example to an antenna, and the plug 12 to the right in the drawing is intended to form the protected connection to an electronic device. In the design represented, it is envisaged that this EMP filter is to be mounted on a housing bushing as an earthing connection. For this purpose, there is present on the outer conductor 10 a flange 13 which, together with a washer 17 or the like and a nut 16 engaged with thread 15 produces a screw fixing to a housing wall. An additional seal 14 made from refined soft copper produces a contact which is low in resistance and low in inductance.

A hollow cylinder 20 is screwed into or mounted on a metal part **10*b* of the outer conductor 10. This hollow cylinder 20 is provided with a threaded sealing cover 21, which is screwed on. The cover 21 forms an electrically conductive connection between a conductor 24, which is of length λ/4 and is inserted in an electrically conductive fashion into the inner conductor 30 of the coaxial conductor, and the hollow cylinder 20**. As is known, the result is formation of a λ/4 short circuit having a passband for a specific frequency band, which discharges the interference currents from the coaxial conductor.

It is precisely this limitation to one frequency band which the invention is intended to abolish. For this purpose, further hollow cylinders 25, 26 that is sleeves are arranged in the hollow cylinder 20. These further hollow cylinders 25, 26 are mounted in an open fashion at one of their ends which is directed toward the inner conductor 30 of the coaxial conductor, and are mounted on the conductor 24 at their other end. The outermost further hollow cylinder 26 is mounted in an electrically conductive fashion on the conductor 24; present in this hollow cylinder 26 is the further hollow cylinder 25 which, for its part, is connected in a conductive fashion to the conductor 24, with the result that a series connection of cavity resonators is produced which can be tuned to selected frequencies on the basis of their diameters and the distance from the inner conductor 30 of the coaxial conductor.

It is thereby possible to transmit various frequency bands and protect them against damaging interference, with the result that terminals of the most varied type can be protected against EMP effects.

Figure 2:
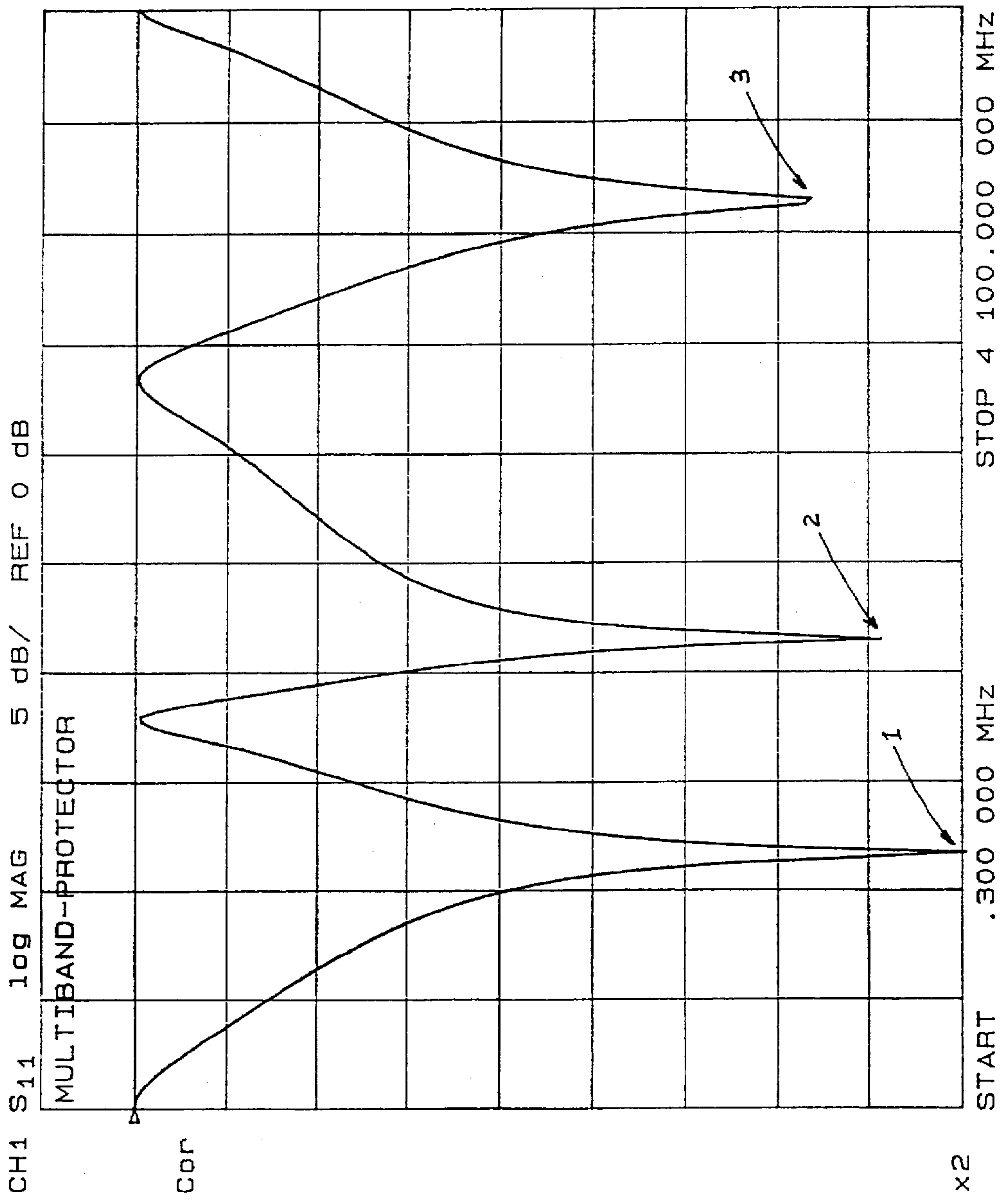
FIG. 2 shows a curve which renders it possible to see the passband through the EMP filter according to the invention at three frequencies.

FIG. 2 shows the tuning achieved in the case of a frequency response of between, for example, 0.3 MHz and 4100 Mhz . Three frequency bands are to be seen, in which signal transmission is performed, specifically at point 1 at a center frequency of 948 Mhz , at point 2 at a center frequency of 1.765 GHz, and at point 3 at a center frequency of 3.39 Ghz . This curve clearly illustrates that it is directly possible by means of the arrangement according to the invention to use series-connected cavity resonators to transmit a plurality of frequency bands and thus to protect terminals against damaging current surges.

I claim:

1. An EMP filter in a coaxial line, comprising a housing mounted in an outer conductor of the coaxial line, and a λ/4 short-circuiting conductor, which is connected in an electrically conductive fashion at one end to an inner conductor of the coaxial line, and is connected in an electrically conductive fashion at another end to the housing, and further comprising between the housing and the short-circuiting conductor at least two sleeves residing one within the other and both residing within the housing, the at least two sleeves spaced apart from each other and from the housing, the at least two sleeves being connected to the short-circuiting conductor in a conductive fashion, wherein a length of the short-circuiting conductor corresponds to the λ/4 wavelength of the lowest frequency band transmitted on the coaxial line.

2. The EMP filter according to claim 1, wherein the length of the short-circuiting conductor and the length of the housing are tuned to the λ/4 wavelength of the lowest frequency band transmitted.

3. The EMP filter according to claim 1 or 2, wherein said at least two sleeves form a plurality of cavity resonators connected in series and tuned with their respective lengths to frequency bands to be passed.

4. The EMP filter according to claim 3, wherein the cavity resonators are connected as secondary sleeves in an electrically conductive fashion to an end of the short-circuiting conductor and coaxially arranged therewith, wherein the short-circuiting conductor is connected to the inner conductor of the coaxial line.

5. The EMP filter according to claim 4, wherein respective diameters of the at least two sleeves are tuned to the frequency bands to be passed.

6. The EMP filter according to claim 5, wherein tuning of the frequency bands is determined by a position of electrical contact of the at least two sleeves on the short-circuiting conductor.

7. The EMP filter according to claim 4, wherein an overall mechanical length of the at least two sleeves is shortened to form cavity resonators of higher capacitance.

* * * * *